UNITED STATES PATENT OFFICE.

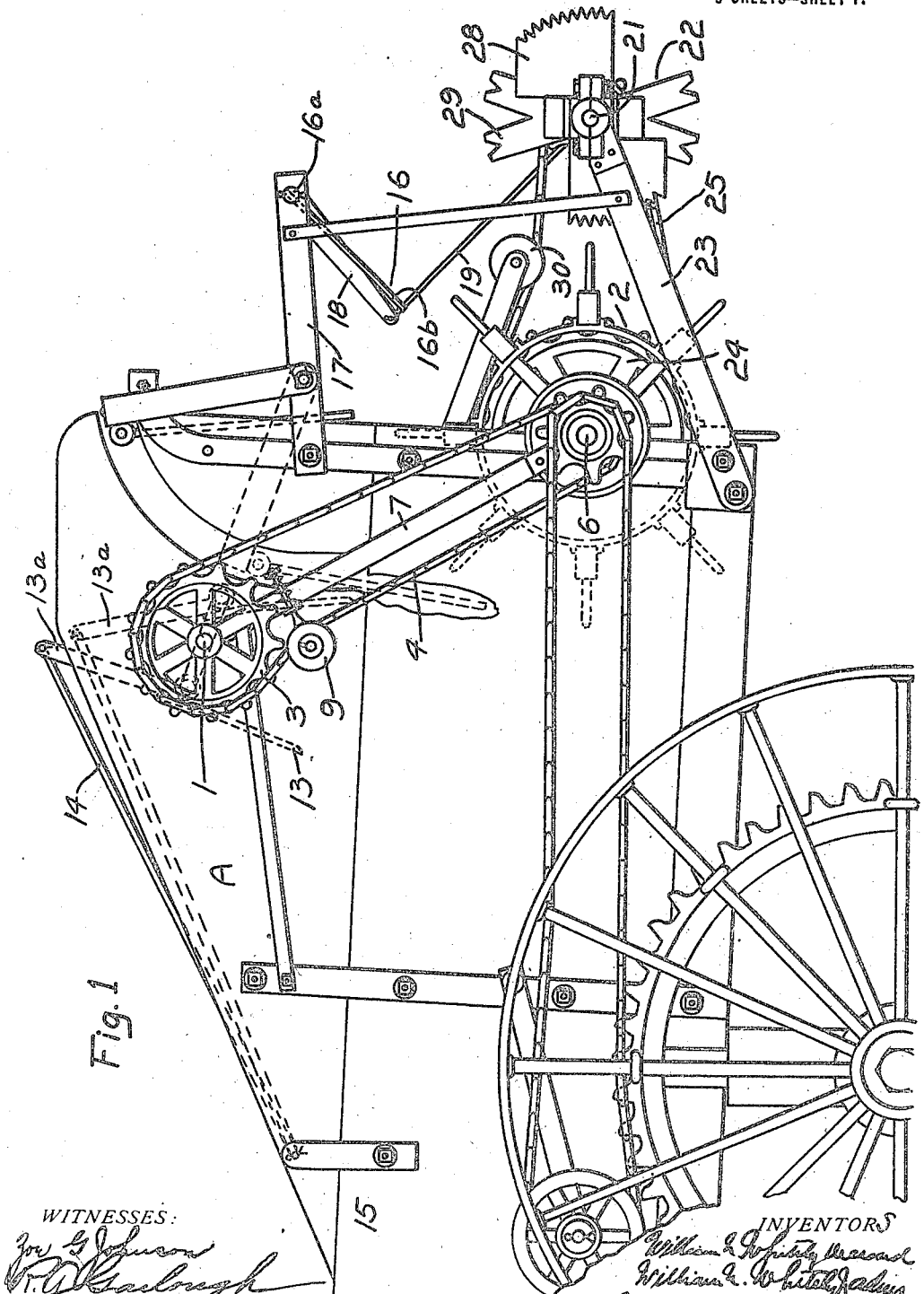

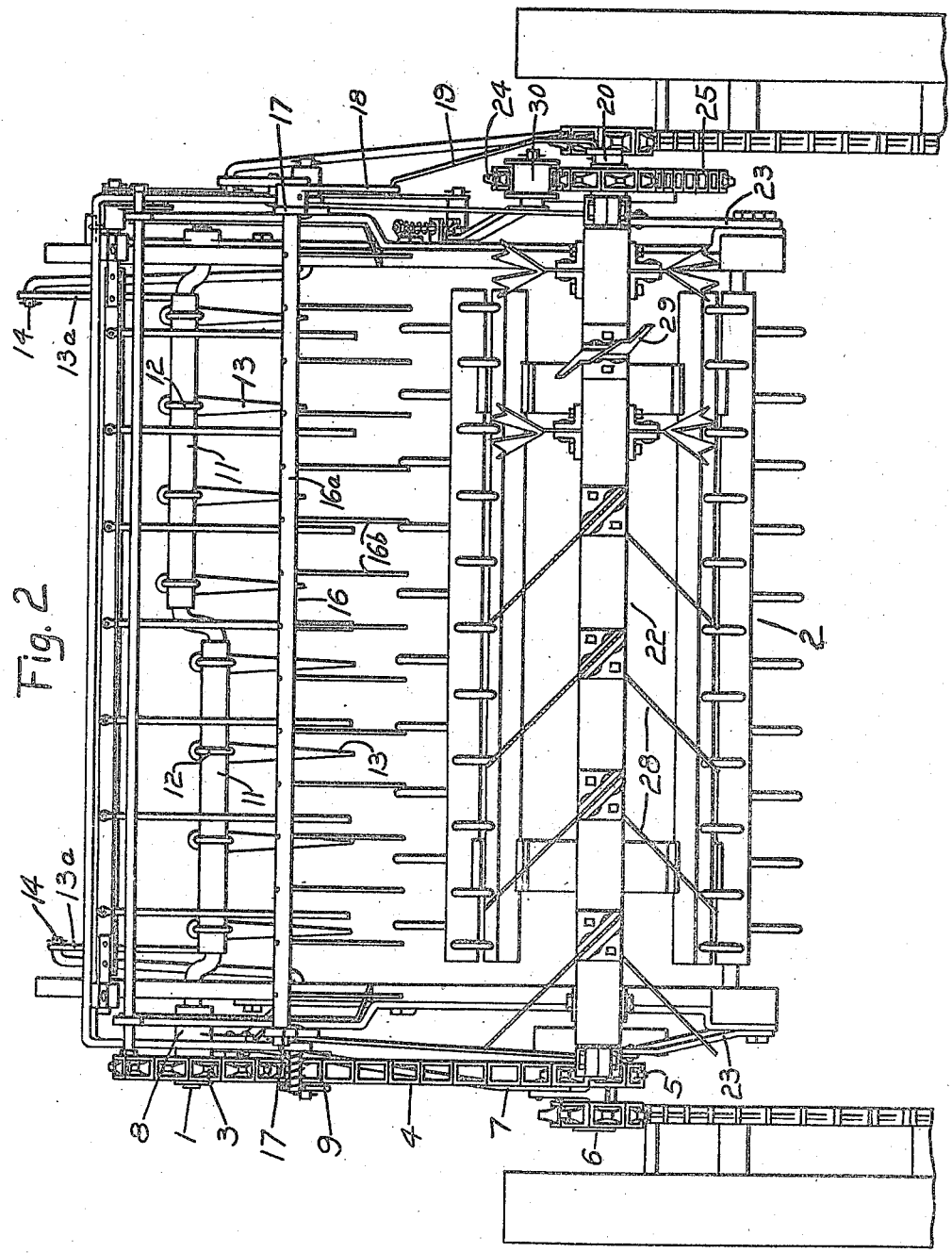

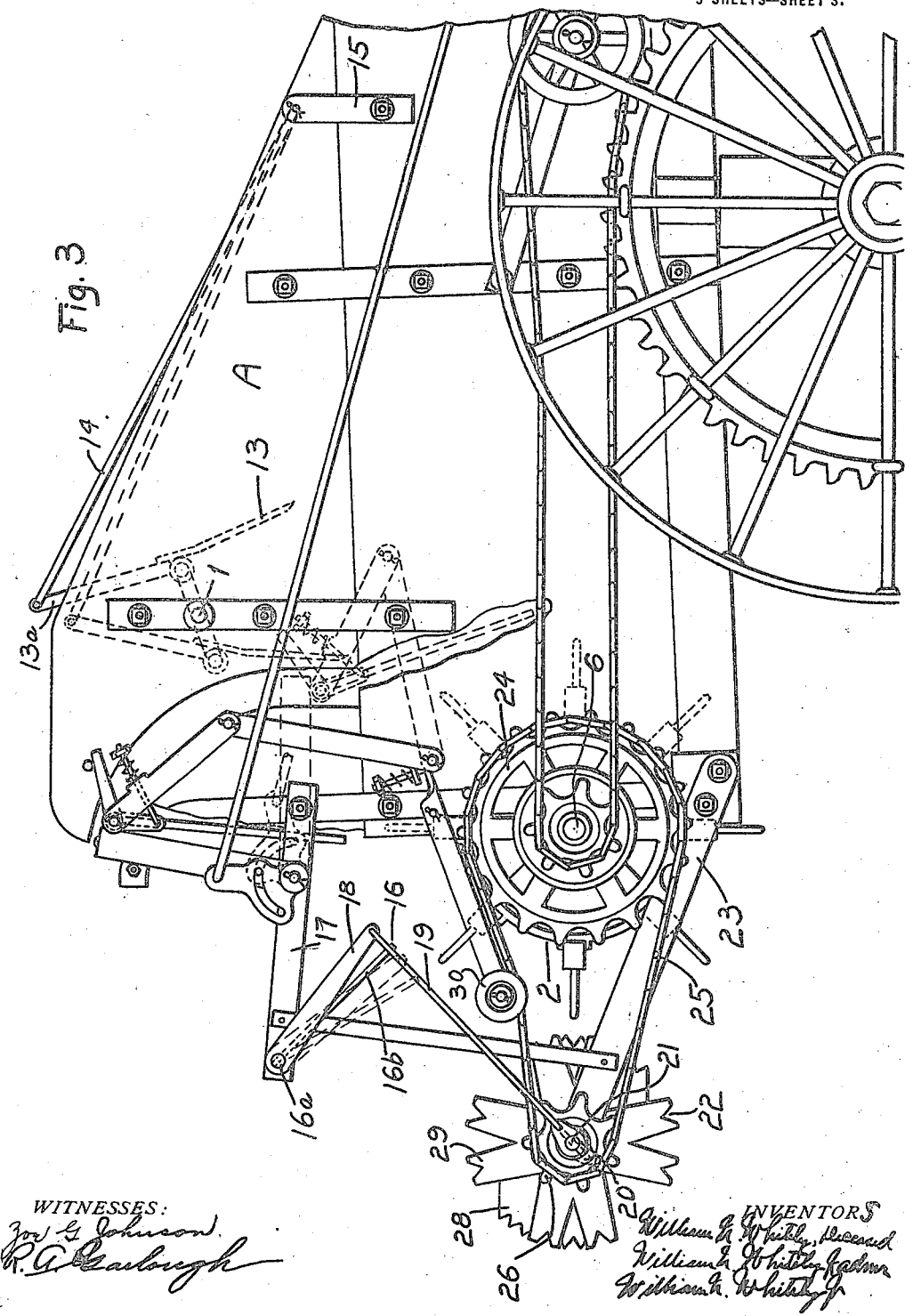

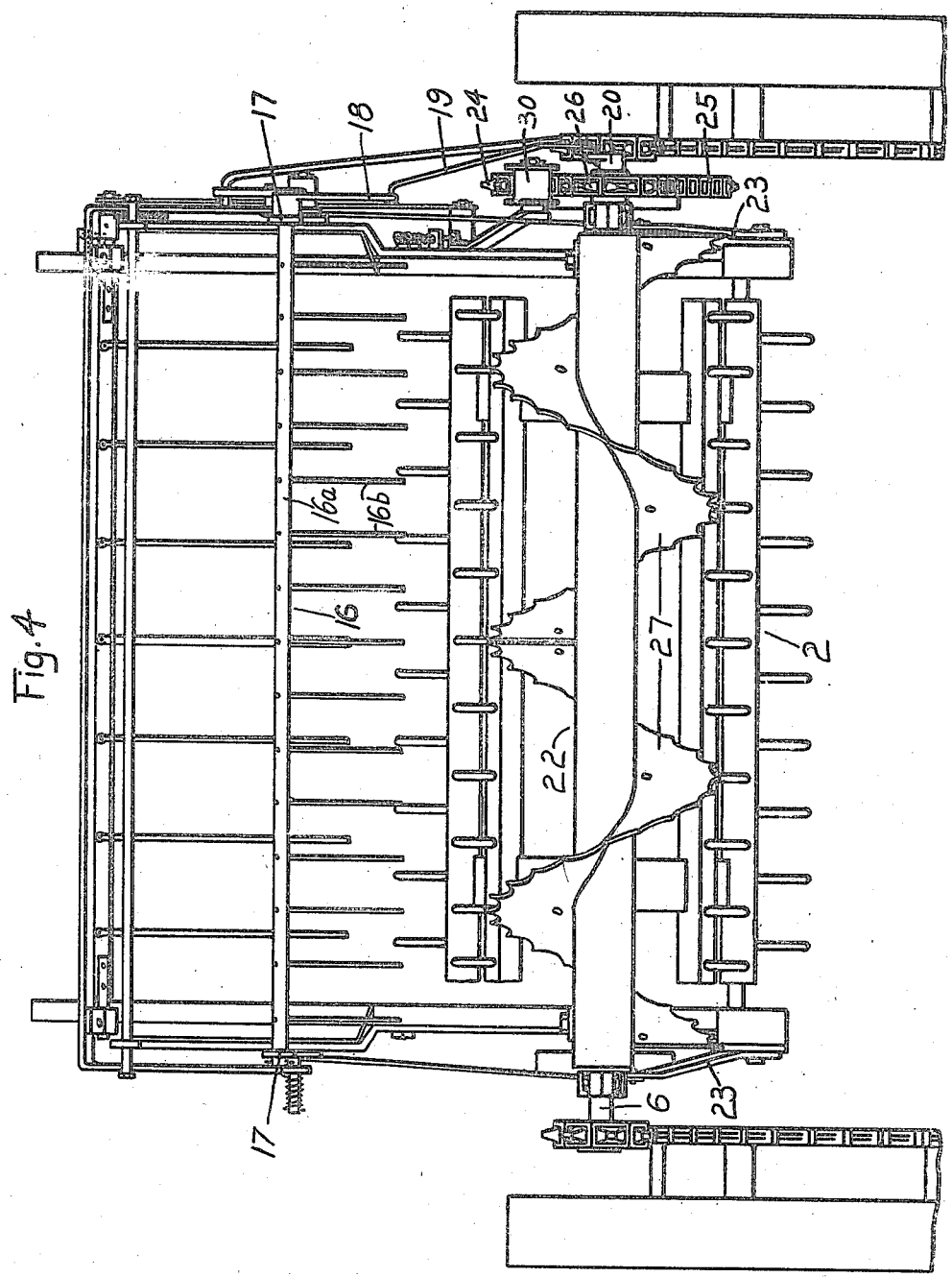

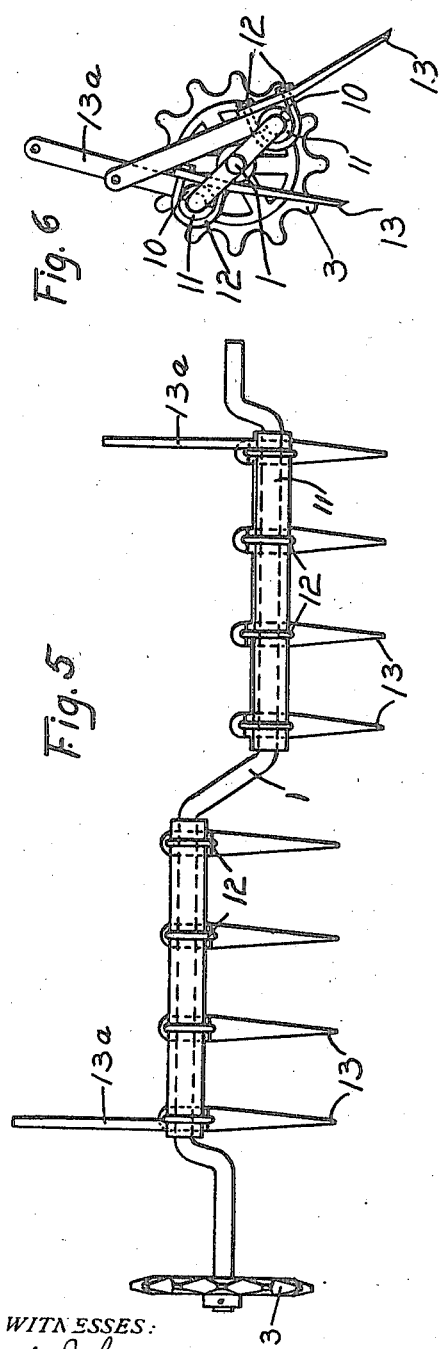
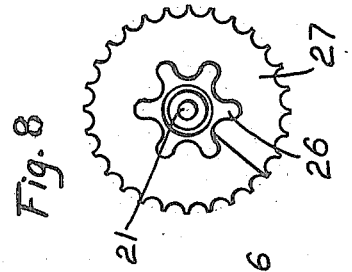
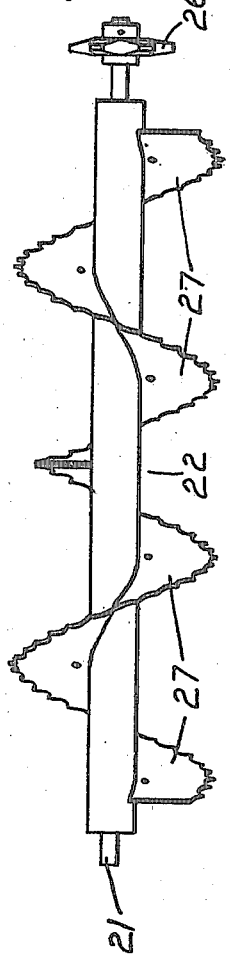

WILLIAM N. WHITELY, DECEASED, LATE OF SPRINGFIELD, OHIO, BY WILLIAM N. WHITELY, JR., ADMINISTRATOR, AND WILLIAM N. WHITELY, JR., OF SPRINGFIELD, OHIO, ASSIGNOR INDIVIDUALLY AND AS ADMINISTRATOR, BY MESNE ASSIGNMENTS, TO INTERNATIONAL HARVESTER COMPANY OF NEW JERSEY, A CORPORATION OF NEW JERSEY.

MANURE-SPREADER.

1,187,954.

Specification of Letters Patent. Patented June 20, 1916.

Application filed April 13, 1911. Serial No. 620,934.

*To all whom it may concern:*

Be it known that WILLIAM N. WHITELY, deceased, late a resident of Springfield, county of Clark, and State of Ohio, and WILLIAM N. WHITELY, Jr., of same place, citizens of the United States, did invent certain new and useful Improvements in Manure-Spreaders; and I, WILLIAM N. WHITELY, Jr., administrator of the estate of William N. Whitely, deceased, and for myself, do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in manure spreaders.

One object of our invention is to provide gyrating forks coöperating with the discharge cylinder which loosen the load and take the weight of manure off of the cylinder to prevent choking and which also permit loading the bed with a very high load without danger of the manure massing on the cylinder and choking down the machine or throwing out portions of the load in bunches.

Another feature of our invention is to provide a secondary vibrating rake and secondary distributing cylinder in rear of the main discharge cylinder by which the manure is further submitted to a refining and spreading operation to reduce it to a still finer condition and cause it to be widely and evenly spread in a swath which will extend beyond the wheel tracks.

In the drawings: Figure 1 is a side view of a portion of a manure spreader showing the means of driving the gyrating forks. Fig. 2 is a rear view of the same. Fig. 3 is a view of same from the side opposite to Fig. 1 showing one means of driving the vibrating rake and distributing cylinder in rear of the main discharge cylinder. Fig. 4 is a rear view showing the secondary distributing cylinder and vibrating rake. Fig. 5 is a rear view of the gyrating forks separated from the machine. Fig. 6 is an end view of Fig. 5. Fig. 7 is a rear view of the secondary distributing cylinder separated from the machine. Fig. 8 is an end view of same.

The running gear and bed may be of any desired type.

The various parts of our invention are preferably constructed as follows: The crank shaft 1 is rotatably mounted in inclined sideboard extensions A of the bed above and in advance of the cylinder 2 and has a sprocket 3 secured to one end, the sprocket 3 is driven by a chain 4 which receives power from a driving sprocket 5 attached to the shaft 6 of cylinder 2. There is a distance bar 7 between the shaft 6 and bearing 8 of crank shaft 1 so that the pull of chain 4 will not vary the distance between the axial centers of shafts 1 and 6. A spring idler 9 may be mounted on distance bar 7 in any suitable manner to take up the slack of chain 4.

It will be noted that the crank shaft 1 preferably has two cranked or offset portions on each of these are clamped two half boxes or pivotal bearings 10 and 11 by means of U bolts 12 which also serve to secure the fork teeth 13 in place. By this means the half boxes 10 and 11 serve when bolted together as pivotal bearings or sleeves for the gyration of the fork teeth 13, the two, the pivotal bearings or sleeve and the teeth operatively forming what we term the "gyrating forks," as the two forks are duplicates but one need be described. One tooth of each fork has an extension 13ª near the side of the bed and a link 14 is pivoted to the end of this extension and to a clip 15 on the side of the bed forward of the location of the forks, by means of these extensions 13ª and the links 14 the forks 13 are gyrated in a rotary path of travel upward and forward toward the load in the bed and downward and rearward at the end of the load so as to lift the load off of the cylinder 2 and allow the manure to flow in a loose stream below the points of the forks 13 (when in the lowest horizontal plane or point of rotation) to the cylinder 2. The advantage of the alternate lifting and stirring action of the forks 13, due to the throw of the double cranked portions of the shaft 1, being that while this movement relieves the cylinder and prevents choking and allows a high load to be discharged freely and evenly, at the same time the load is not violently agitated nor thrown forward in an accumulated mass in the bed. The gyrating forks 13 act as regulators to govern the flow to the cylinder and yet they do not cause a stoppage and bank the manure up or push it forward and tend to spill it over the sides of the bed forward of the cylinder 2. It is therefore important and preferable that they be located above and somewhat in advance of the cylinder 2 (not far enough forward though to interfere with loading the bed to its full capacity) and that they have alternate forward and upward motion so that only a portion of the end of the load is acted on by each section at one time and that the speed of shaft 1 be reduced lower than that of cylinder 2 by using a larger sprocket 3 on the shaft 1 than sprocket 5 which drives sprocket 3 so as to reduce the power required and to prevent forks 13 from throwing the latter portion of the load forward in the bed when the load is about to be finally discharged.

The vibrating rake 16 is preferably composed of a head portion 16ª and a plurality of teeth 16ᵇ, the head portion 16ª located above and in rear of cylinder 2 with the teeth inclined downward and forward in close proximity to the teeth of the cylinder 2.

17 indicates support arms extending rearwardly from the sides of the bed in which the head portion 16ª is pivoted, there is a crank 18 secured to the head portion 16ª and to this crank is pivoted one end of a pitman 19 the other end of which is pivoted to a drive crank 20 secured to shaft 21 of cylinder 22.

The rake 16 setting at an angle to cylinder 2 and in close proximity in rear thereof and having a vibrating motion in the line of discharge is effective in retarding and shaking apart bunches of hay or straw manure which may slip through in sheets and get past the discharge opening of the bed without being separated, it will hold them on its upper side and by its vibration in the time of discharge will beat the sheets of manure to pieces and also coöperate with the teeth of cylinder 2 in disintegrating the manure, the rake 16 and cylinder 22 coöperate by reason of the rake 16 acting to regulate the flow of manure so that none is discharged over or away from the action of cylinder 22, all of the manure being directed by the rake 16 and the discharge action of cylinder 2 toward the axis of cylinder 22, whether the manure be light or heavy and regardless of the varying speed at which the horses may pull the machine. This improves the work done by cylinder 22 and makes a regular and even spread in all kinds of manure.

The cylinder 22 has a shaft 21 which is supported by arms 23 fastened to the sills of the bed and projecting upward and rearward to receive the cylinder 22. The cylinder 22 may be driven either in the same path of rotation as cylinder 2, as shown in the drawings or may be rotated in the opposite direction by such means as are well known in the art.

A sprocket 24 is secured to the shaft of cylinder 2 and there is a chain 25 from said sprocket to a sprocket 26 secured to shaft 21, the sprocket 24 being much larger than sprocket 26 produces high speed in the rotation of cylinder 22.

There are distributers 27 which may be of any suitable size, shape or arrangement. They are attached to cylinder 22 to refine and spread or laterally distribute the manure in a wide swath. Should the cylinder 22 be rotated in the opposite direction to cylinder 2 it will be reversed or turned around so as to bring the distributers 27 into action to spread wide. The distributers may be formed in blade like shape as shown by 28 in Fig. 1 and there may be companion blades 29 so as to distribute the manure in one direction laterally. An idler 30 may be used to take up the slack of chain 25 and may be arranged in any well known way suitable for this purpose.

We claim:

1. In a manure spreader, the combination of a manure bed, a discharge cylinder located at one end thereof, a distributing member in the rear of said discharge cylinder, actuated means in advance of said discharge cylinder to act upon the manure, and actuated means between said cylinder and distributing member to act further upon the manure before it is finally distributed.

2. In a manure spreader, in combination, a manure bed, a discharge cylinder located at one end of said bed, a vibrating rake supported on the discharge side of said cylinder and comprising a plurality of teeth inclined forward and downward and terminating on the discharge side of said cylinder away from the load in said bed, a head of said rake to which said teeth are secured, pivotally supported in bearings on either side of said bed, a distributing cylinder supported in rear of said discharge cylinder whereby the manure is distributed laterally and means for driving said discharge cylinder, vibrating rake and distributing cylinder whereby the manure is first refined and directed toward the axis of said distributing cylinder by said discharge cylinder and vibrating rake, and by said distributing cylinder the manure is distributed in a wide, even swath on the ground.

3. In a manure spreader, a manure bed, a discharge cylinder located at one end thereof, a distributing cylinder supported in the rear of said discharge cylinder, a fore and aft swinging detainer carried between said cylinders, and means for actuating said detainer.

4. In a manure spreader, a manure bed, a discharge cylinder carried at one end thereof, a distributing cylinder carried in the rear of the discharge cylinder, and actuated means carried between said cylinders and coöperating with both to assist in the disintegration of the manure.

In testimony whereof, I affix my signature in presence of two witnesses.

WILLIAM N. WHITELY, JR.,
Administrator of the estate of William N. Whitely, deceased.

WILLIAM N. WHITELY, JR.

Witnesses:
R. A. GARLOUGH,
ZOE G. JOHNSON.